United States Patent [19]
Gold

[11] Patent Number: 4,993,128
[45] Date of Patent: Feb. 19, 1991

[54] CLOSURE MECHANISM

[76] Inventor: Danny Gold, 27 Barker Road, Apt. E-2, Hong Kong, Hong Kong

[21] Appl. No.: 379,411

[22] Filed: Jul. 13, 1989

Related U.S. Application Data

[63] Continuation of Ser. No. 200,057, May 28, 1988, Pat. No. 4,864,695.

[51] Int. Cl.$^5$ ............................................... A41F 1/00
[52] U.S. Cl. ...................................... 24/715.3; 24/300; 24/712
[58] Field of Search .................. 24/712, 713.2, 713.3, 24/715.3, 598, 300, 30.5 R, 482

[56] References Cited

U.S. PATENT DOCUMENTS

| | | | |
|---|---|---|---|
| 885,933 | 4/1908 | Lindy | 24/598 |
| 1,770,786 | 7/1930 | Kohler | 24/715.3 |
| 2,113,731 | 4/1938 | Kennedy | 24/713.2 |
| 2,214,105 | 9/1940 | Hordiner | 24/712 |
| 2,336,950 | 12/1943 | Moss | 24/712 |
| 2,636,236 | 4/1953 | Peterson | 24/712 |
| 2,832,116 | 4/1958 | Clevett, Jr. et al. | 24/30.5 R |
| 2,869,205 | 1/1959 | Kacowski | 24/715.3 |
| 3,654,674 | 4/1972 | Abner | 24/482 |
| 4,423,539 | 1/1984 | Ivanhoe | 24/715.3 |
| 4,694,541 | 9/1987 | Skyba | 24/300 |

*Primary Examiner*—Victor N. Sakran
*Attorney, Agent, or Firm*—Aufrichtig Stein & Aufrichtig

[57] ABSTRACT

A closure mechanism for a tubular member, open-ended container or glove. A channel member coupled to the portion to be closed forms a channel of an opened length corresponding to a distance around the portion to be closed. The channel has a cross-sectional area and terminates with one or two closely spaced openings having an opening cross-sectional area. A stretchable cord is present within the channel and extends outward beyond at least one of the openings. The stretchable cord has an unstretched cross-sectional area and a stretched cross-sectional area. The unstretched cross-sectional area is larger than the stretched cross-sectional area and the opening cross-sectional area. By pulling on the portion of the stretchable cord extending out of the opening or openings, the stetchable cord takes on the stretched cross-sectional area at least proximate the opening or openings. As a result, the stetchable cord freely slides in the channel and when the stetchable cord is then released, the stretchable cord returns to the unstretched cross-sectional area proximate the opening or openings. As a result, the stretchable cord is locked in the opening or openings and the channel is shortened to a closed length less than the opened length. This secures the tubular portion surrounded by the closure mechanism in a closed position. A release member is utilized to lengthen the channel from its closed length to an opened length and may be operated with only one hand.

36 Claims, 2 Drawing Sheets

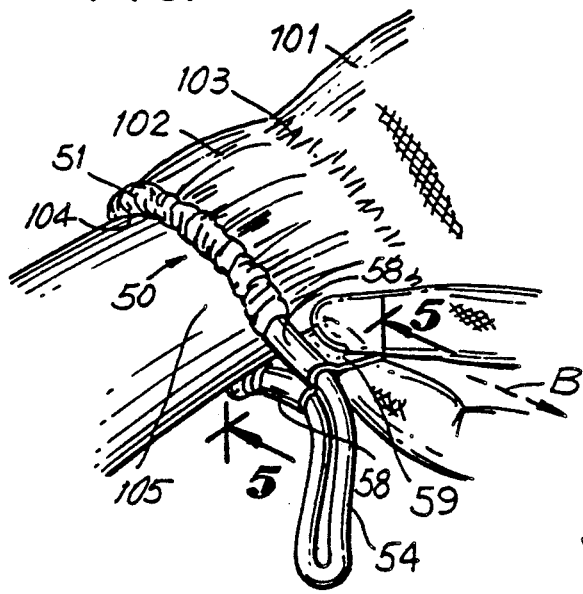
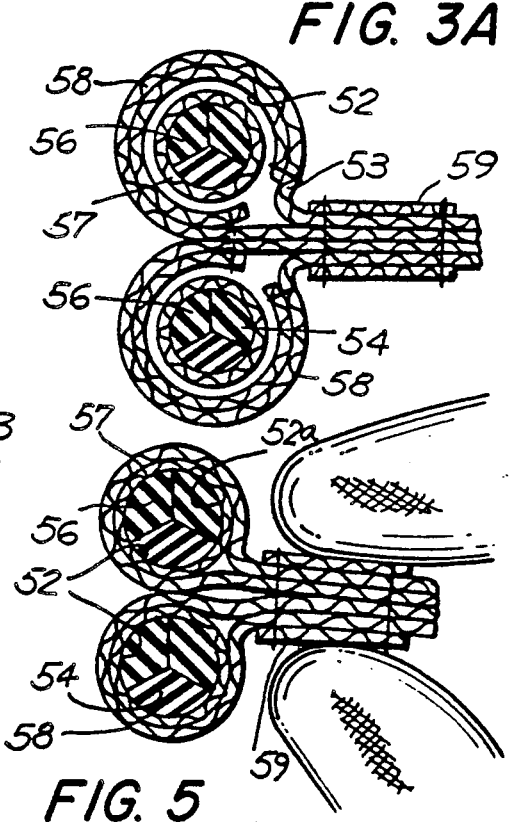
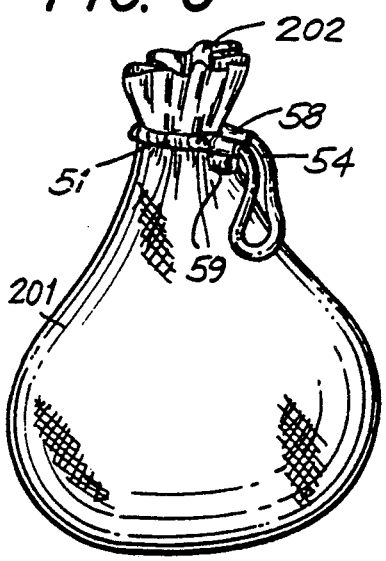
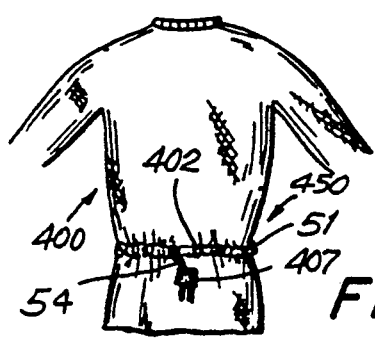
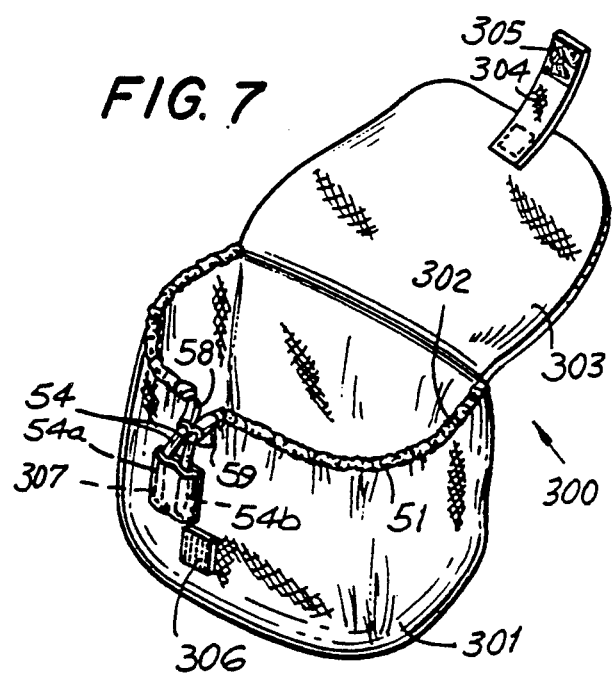

CLOSURE MECHANISM

This is a continuation of application Ser. No. 07/200,057 filed May 28, 1988 now U.S. Pat. No. 4,864,695.

BACKGROUND OF INVENTION

This invention is generally directed to a closure mechanism, in particular for an open-ended container and even more particularly to an improved closure mechanism for open-ended containers such as gloves, handbags, knapsacks, and other containers of varying types and for securing tubular portions of containers and garments in a closed position.

In various containers and in particular with respect to gloves and even more particularly with respect to ski gloves, there is a need to close the open end of the glove around the wearer's wrist. There are competing design considerations, with particular respect to ski gloves, for the open end of the glove. Generally, the glove extends beyond the hand to cover at least the wearer's wrist and often a portion of the lower arm. To facilitate the insertion of the hand into the glove, the open end of the glove is generally desired to be widened. However, if the open end of the glove is widened it will allow cold air to enter the glove, thereby interfering with the warming function of the glove.

As a result, various closure mechanisms for ski gloves have been developed to allow easy entry of the hand through a widened opening while creating a mechanism for tightening the open end of the glove around the wearer's wrist or lower arm to form a seal. An initial approach was to use elastic around the opening to exert an inward pressure around the wearer's wrist or lower arm. However, this approach suffers from the elastic tending to close the open end of the glove when not on the wearer's hand. It has the effect of making it difficult to put a hand into the glove, which is undesirable. This problem is heightened under cold weather conditions and when the wearer's other hand is already in a glove. In addition, the pressure exerted is not adjustable and will not be appropriate for different wearer's arms. Another approach utilizes a strap with a buckle which allows the wearer to cinch the open end of the glove around the wrist or lower arm after the glove has been placed on the hand. However, this approach suffers from the disability of requiring a buckle and often being difficult to operate when both hands are in gloves. Further, this approach often results in significant difficulty in releasing the buckle to release the wearer's hand from the glove. Another approach which has been utilized is a strap wound around a metal loop sewn into the glove and held in place by a VELCRO hook and pile fastener arrangement. However, this approach suffers from the difficulty in releasing the generally very thin VELCRO pad when the ski gloves are on the wearer's hands.

Likewise, knapsacks, handbags and tote bags require a closure mechanism to close off or at least restrict the size of the opening when they are to be carried. Generally, prior drawstring arrangements have included use of a buckle or other separate closure member or members in connection with the drawstring to hold the drawstrings in a tightened position. This approach is expensive and again, often is difficult to release to open the pouch or bag.

Further, there is often a need to tightly fit and secure a portion of a glove or other garment at an intermediate position. In a glove extending up the wearer's arm, it is desirable to selectively tighten the glove both at the end of the hand and at the end of the glove. In a jacket it is desirable to tighten the coat about the wearer's waist, even if the bottom of the coat hangs loosely, to keep the warm area surrounding the wearer's torso enclosed.

Accordingly, there is a need for an improved closure mechanism for ski gloves, pocketbooks, knapsacks, jackets, and assorted other cloth, leather, and pliable synthetic fabric containers and clothing which simply and efficiently closes an open end or intermediate portion of a glove or other container or article of clothing while facilitating single handed release of the closure mechanism.

SUMMARY OF THE INVENTION

The invention is generally directed to a closure mechanism for an open-ended container. A channel member is coupled at or near the open end of the container for forming a channel of an open length, corresponding to the distance around the open end. The channel has a channel cross-sectional area and terminates in two closely spaced openings, each having an opening cross-sectional area. A stretchable cord member is located within the channel and extends outwardly beyond both of the openings. A stretchable cord member has an unstretched cross-sectional area and a stretched cross-sectional area. The unstretched cross-sectional area is larger than the stretched cross-sectional area and the opening cross-sectional area. By pulling on the portion of the stretchable cord member extending out of both openings, the stretchable cord member takes on the stretched cross-sectional area proximate the opening. As a result, the stretchable cord member freely slides in the channel. When the stretchable cord member is then released, the stretchable cord member takes on the unstretched cross-sectional area proximate the openings, thereby locking the stretchable cord member in the openings and shortening the channel member to a closed length which is less than the open length and secures the open end of the container in a closed position. A handle member coupled proximate the opening allows expansion of the channel from the closed distance to the open distance, thereby releasing the closure mechanism.

The invention is also directed to a closure mechanism for a glove. A channel member forms a channel at or near the hand opening of the glove. The channel member has an opened length corresponding to an opened distance around the hand opening. The channel has a channel cross-sectional area and terminates in two closely spaced openings, having an opening cross-sectional area. A stretchable cord member is located within the channel and extends outwardly beyond both openings. The stretchable cord member has an unstretched cross-sectional area and a stretched cross sectional area. The unstretched cross-sectional area is larger than the stretched cross-sectional area and the opening cross-sectional area. By pulling on the portion of the stretchable cord member extending out of both openings, the stretchable cord member takes on the stretched cross-sectional area proximate at least one of the openings to allow the stretchable cord member to freely slide in the channel. When the stretchable cord member is released, it takes on the unstretched cross-sectional area proximate both openings, thereby locking the stretchable cord member in the opening and shortening the channel to a closed length which is less than the opened length and secures the opened end in a closed position. When a handle release member, which is coupled proximate to the openings, is pulled on, the channel means is stretched, expanding the channel from the closed distance to the open distance, thereby releasing the closure mechanism.

Accordingly, it is an object of the invention to provide an improved closure mechanism for an open-ended container.

Another object of the invention is to provide an improved closure mechanism for a glove.

A further object of the invention is to provide an improved closure mechanism and release mechanism for an open-ended container.

Still another object of the invention is to provide an improved closure mechanism and release mechanism for a glove which permits closure and then release of the closure mechanism with a gloved hand.

Yet another object of the invention is to provide an improved closure mechanism tightening a selected portion of a tubular member.

Yet another object of the invention is to provide an improved closure mechanism which does not require a buckle or other additional closure member.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3A is a cross-sectional similar to FIG. 3 in accordance with an alternative embodiment of the invention;

FIG. 4 is a partial cross-sectional view of the glove incorporating the closure mechanism in accordance with the invention in a closed, locked position;

FIG. 5 is a cross-sectional view taken along line 5—5 of FIG. 4;

FIG. 6 is a perspective view of a sack incorporating the closure mechanism in accordance with the invention in a locked, closed position;

FIG. 7 is a perspective view of a pocketbook incorporating the closure mechanism in accordance with the invention; and FIG. 8 is a perspective view of a jacket incorporating a closure mechanism in accordance with another embodiment of the invention.

DETAILED DESCRIPTION OF THE PREFERRED EMBODIMENTS

Figure 1:
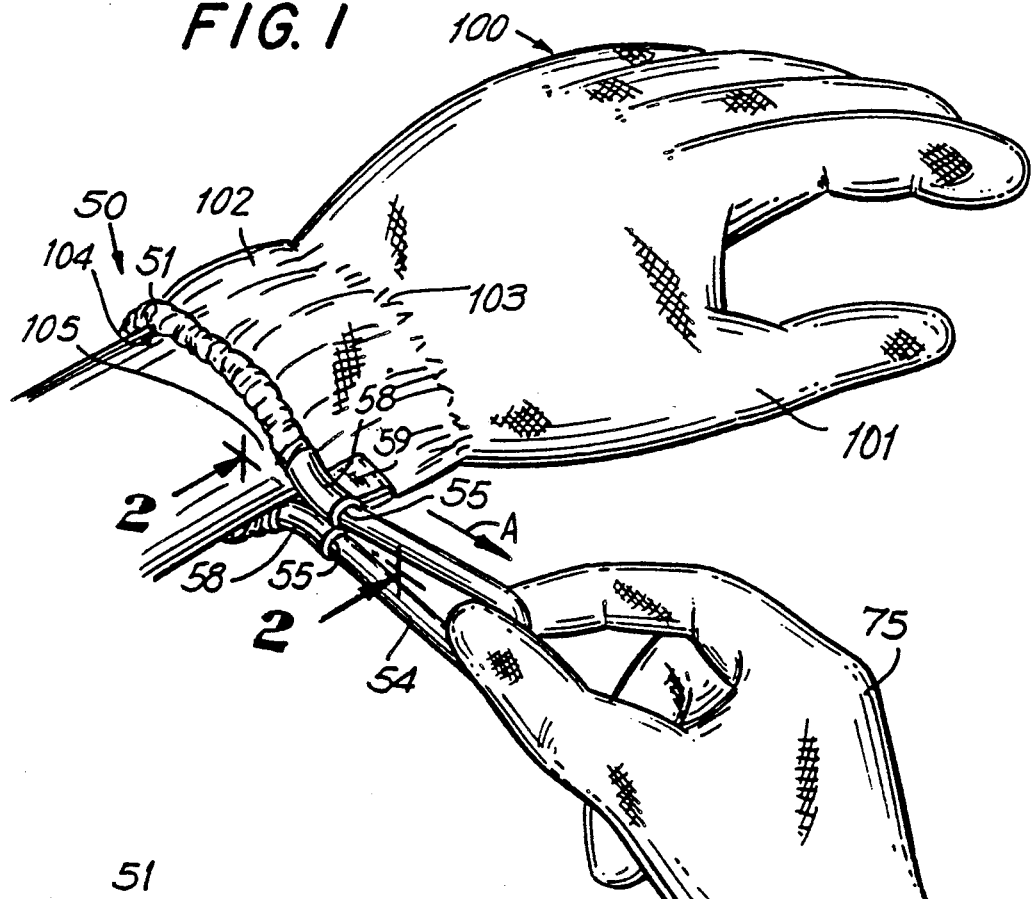
FIG. 1 is a perspective view of a glove constructed in accordance with a preferred embodiment of the invention.

Reference is first made to FIG. 1 wherein a glove, generally indicated as 100, incorporating a closure mechanism generally indicated as 50, constructed in accordance with a preferred embodiment of the invention is depicted.

Glove 100 includes a hand portion 101 and a wrist portion 102. An elasticized portion 103 between hand portion 101 and wrist portion 102 aids in fitting hand portion 101 of glove 100 to the wearer's hand. Wrist portion 102 is made larger than the wearer's wrist so that easy entry into the glove is achieved, even under extreme cold weather conditions where one of the wearer's hands is already in a glove and must use the gloved hand to support the second glove so that the second hand can be inserted into the second glove. Under such cold weather conditions the dexterity of the wearer's ungloved hand is reduced while the gloved hand has its dexterity reduced by virtue of the bulkiness of the glove. As a result, it is important that opening 104 of glove 100 at the end of wrist section 102 be wide enough to allow easy insertion of the hand. However, opening 104 must be restricted tightly to the wearer's wrist 105 as shown in FIG. 1 when the glove is worn to maintain the desired thermal insulating qualities of glove 100.

Figure 2:
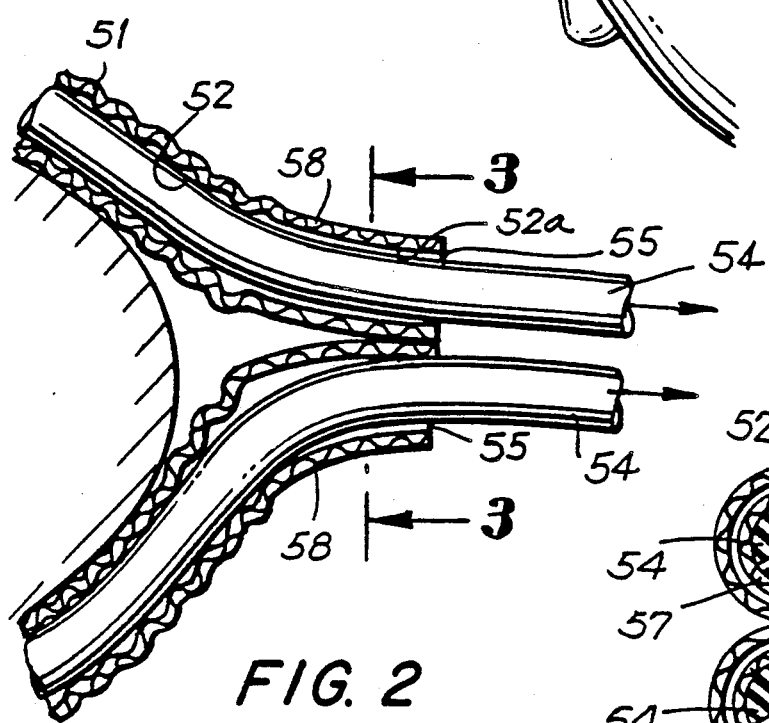
FIG. 2 is a cross-sectional view taken along line 2—2 of FIG. 1.
Figure 3:
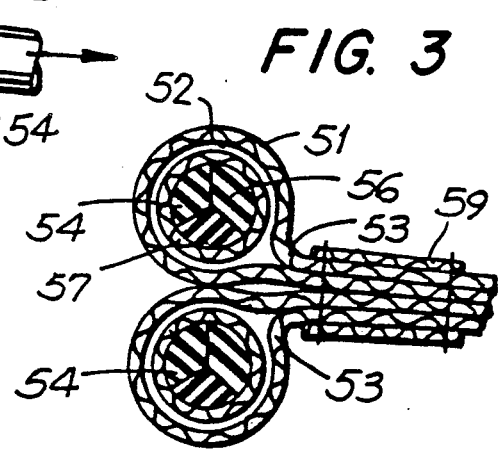
FIG. 3 is a cross-sectional view taken along line 3—3 of FIG. 2.

This is accomplished by closure mechanism 50 which includes a channel member 51 which forms a channel 52 at the end of wrist portion 102. It is noted that glove 100 may terminate at the end of the hand portion or may indeed extend further up the wearer's arm depending upon the application of the glove. Channel member 51 creates a channel 52, best seen in FIG. 3, within channel member 51. Again, as best seen in FIG. 3, channel 52 is formed in a preferred embodiment by overlapping the end of channel member 51 with stitching 53 to form a fixed channel 52. In the preferred embodiment, channel member 51 includes the end section of wrist portion 102 for increased strength of construction and economy. As seen in FIGS. 1 and 2, channel member 51, which may be formed of a variety of materials such as nylon, polyester, poly-cotton, or other commonly used glove materials, gathers to reduce the length of channel 52 and accordingly the cross-sectional area of opening 104. The material used for channel member 51 should be crushable so as to allow gathering of the material in a closed position which decreases the effective length of channel 52.

An elastic shockcord 54 is inserted through channel 52 and extends outwardly beyond openings 55 at the ends of channel 52. In FIG. 1, shockcord 54 is shown as a closed loop. However, shockcord 54 can be in the form of a section of shockcord with two free ends extending outwardly from openings 55 (FIG. 7). In such case an end grip 307, tassels or other end pieces can be placed on shockcord 54 to prevent the ends of shockcord 54 from entering openings 55 and to more easily grip shockcord 54 with a gloved hand. A hook and pile connector can be used to keep end grip 307 against the surface of the glove. One of the connector pads would be on end grip 307 and the other on a convenient location, such as handle 59. In another embodiment, the free ends of the shockcord are attached to the channel a distance from openings 55 to present a closed loop outside of openings 55. Alternatively, two separate pieces may be used, each of which has one end coupled inside channel 52 and the other end free outside openings 55.

Shockcord 54 is composed of elastic strips 56 surrounded by an outer layer 157. In a preferred embodiment elastic members 56 are formed of strips of elastic rubber and outer layer 157 is formed of a woven cotton. While the specific physical characteristics of shockcord (drawstring) 54 can be varied and a variety of different materials utilized, the basic requirement for shockcord 54 is a capability to stretch when pulled by two fingers as shown in FIG. 1 and a resultant effect of the cross-sectional area of shockcord 54, and particularly the portion of shockcord 54 proximate openings 55, being reduced from its unstretched state. This is the general reaction of elastic shockcords to the application of stress of the sort shown in FIG. 1 applied along the length of the shockcord 54 in the direction of arrow A. The cover 157 of shockcord 54 should be sufficiently flexible so as to allow conformity to the wearer's wrist as well as channel 52. Furthermore, the outer surface 157 should not be so abrasive as to exert significant friction upon the inside of channel member 51 as the wearer pulls on shockcord 54. The portions of channel member 51 proximate openings 55, identified as opening regions 58, have a reduced cross-sectional area as compared to the rest of channel 52. Opening region 58 extends only about 1-2 cm in a preferred embodiment. Under varying conditions opening region 58 can be either longer or shorter. The cross-sectional area of channel 52 within opening region 58 is selected so as to be less than the cross-sectional area of shockcord 54 in its unstretched state. However, in the stretched state of shockcord 54, shockcord 54 moves easily through the portion of channel 52 within opening regions 58, identified as channel region 52a. Channel 52 in a preferred embodiment has a larger cross-sectional area than the unstretched cross-sectional area of shockcord 54.

In an alternate preferred embodiment shown in FIG. 3A, channel region 52a includes an additional cross-sectional area reducing layer 57. Layer 57 in a preferred embodiment is polyvinyl chloride (PVC) coated cotton. The PVC has a non-slip finish which further aids in gripping the shockcord in channel region 52a. Additional layer 57 may be formed of a variety of other materials which may or may not include a non-slip surface. Channel regions 52a may, as shown in FIG. 3, entirely exclude additional layer 57 in favor of construction of channel 52 with reduced cross-sectional channels region 52a.

Channel regions 52a can be formed with shockcord 54 in it by exerting a force on the shockcord as it is assembled so that the required dimensions are maintained. A subassembly can be created to ease assembly of the finished closure mechanism. The shockcord can be stretched and held in place by a holding device. Then, cross-sectional reducing area layers 57, which are formed as bands are sewn around the stretched shockcord 54 the appropriate cross-sectional area without pressure from shockcord 54 which is maintained in its stretched state. Then the shockcord is released from the holding device and a subassembly with a shockcord 54 and two cross-sectional reducing area layers 57 sewn or otherwise fixed in channel 52. Layers 57 can be molded rubber or plastic parts instead of a fabric or leather, in which case shockcord 54 would be threaded through layers 57. Another approach is to sew channel member 51 creating channel 52 and channel regions 52a. Then, shockcord 54 is threaded through channel 52 using a lead thread or wire of smaller diameter.

Closure mechanism 50 also includes a release member or gripping handle 59. Gripping handle 59 in a preferred embodiment is a small piece of fabric or leather sewn or otherwise attached to glove portion 102 close to opening 55 and channel regions 52a. In a preferred embodiment gripping handle 59 is a leather flap sewn to itself through two layers of wrist portion 102 next to channel regions 52a (FIG. 3) which creates a stiffened handle area.

Reference is made to FIGS. 1, 2 and 3 for a description of the manner in which closure mechanism 50 seals the open end 104 of glove 100 against the wearer's wrist 105. First, with channel member 51 extended so as to provide a wide, opened entryway to glove 100, the wearer's hand is inserted into glove 100. Next, the wearer, using his or her other hand 75, grips shockcord 54 and pulls in the direction of arrow A. This has the effect of stretching shockcord 54, thereby decreasing the cross-sectional area of shockcord 54, particularly in channel regions 52a. As the ends of shockcord 54 are pulled, more of shockcord 54 extends out of opening 58. While the length of shockcord remaining in channel 52 is unchanged at this point, it is the same length of stretched shockcord. Then, as pressure on shockcord 54 in the direction of arrow A is released, the cross-sectional area of shockcord 54, particularly in channel regions 52a, increases. This causes shockcord 54 to catch and lock within channel regions 52a, and the stretched portion of shockcord 54 present in channel 52 between regions 52a shrinks in the absence of a further force in the direction of arrow A, thereby causing channel member 51 to gather and the length of shockcord 54 within channel 52 to decrease until shockcord 54 exerts inwardly directed pressure on wrist 105 of the wearer's hand. The gathering of channel member 51 results in the effective length of channel 52 which shockcord 54 traverses being reduced from an opened length to a closed length.

As a result of the reduced cross-sectional area of channel regions 52a, which is less than the unstretched cross-sectional area of shockcord 54, shockcord 54 locks in channel regions 52a, thereby maintaining channel member 51 tightly against the wearer's wrist. All that is required to accomplish this is a simple pull on the ends of shockcord 54 extending from openings 55, followed by releasing the tension on shockcord 54.

This simple action can be performed easily and reliably with a single gloved hand under various inhospitable environmental conditions.

FIG. 2 shows shockcord 54 in its stretched condition where the cross-sectional area of shockcord 54 is less than the cross-sectional area of channel regions 52a. This is the preferred relation; however, it is not necessary that the stretched cross-sectional area of shockcord 54 be smaller than the cross-sectional area of channel regions 52a. Where the surface materials of outside layer 57 of shockcord 52 and the inside of channel member 51 in channel regions 52a should form a relatively low friction connection where the cross-sectional area of stretched shockcord 54 is not less than the cross-sectional area of channel regions 52a.

Reference is next made to FIGS. 4 and 5 wherein a description of the manner in which the release mechanism 59 operates to release closure mechanism 50 from its locked or closed position to its open position is shown, like elements being represented by like reference numerals.

To open closure mechanism 50 the wearer grips handle member 59, which in a preferred embodiment is a strip of leather extending parallel to and adjacent shockcord 54 in channel regions 52a. As handle member 59 is pulled outwardly in the direction of arrow B in FIG. 4, wrist portion 102 of glove 100 and channel member 51 are also pulled in the direction of arrow B. This results in the gathered material of channel member 51 being expanded to increase the effective circumference of channel member 51. By increasing the distance around channel member 51, the effective length of channel 52 is increased so that shockcord 54 is stretched. This stretching occurs at channel regions 52a, decreasing the cross-sectional area of shockcord 54, which allows shockcord 54 to move freely through channel regions 52a and relieve the pressure on the wearer's wrist.

Handle 59 is gripped between the thumb and forefinger of the wearer's other hand and is designed to be large enough to be gripped by gloved fingers. The placement of handle 59 proximate channel regions 52a aids in stretching shockcord 54 proximate channel regions 52a so that shockcord 54 moves relatively easily through channel regions 52a. When pressure is released from handle 59, shockcord 54 returns to its unstretched cross-sectional area preventing the open end of wrist portion 102 from being constricted about the wearer's wrist. In this way the glove can be easily removed and then replaced on the wearer's hand, even under adverse environmental conditions and with the other hand already in a glove. Alternatively, the wearer can hook his finger in the glove near the openings to perform the same result.

Accordingly, the closure mechanism operates to convert the glove from its open position to its closed position. Shockcord 54 is merely pulled outward. This action does not act to shorten the channel member 51. However, when the pressure on shockcord 54 is released, the cross-sectional area of shockcord 54 in channel regions 52a expands and locks the stretched portion of shockcord 54 within channel 52. As the pressure is released from shockcord 54, the stretched shockcord within channel 52 contracts to its unstretched length, which is significantly less than its stretched length, thereby shortening its distance and tightly gripping the wearer's wrist. As shockcord 54 shortens in length, channel member 51 becomes gathered to accommodate the shortened length, thereby shortening the effective length of channel 52. In this state shockcord 54 grips the wearer's wrist tightly to maintain a seal around the wearer's wrist.

Releasing the closure mechanism is performed by pulling handle portion, 59 which expands gathered channel member 51, thereby extending the effective length of channel 52. The extension of the length of channel 52 has the effect of stretching the portion of shockcord 54 within channel 52. As a result, the stretched portion, particularly that present proximate channel regions 52a, has an effective reduction of cross-sectional area so that additional shockcord is drawn into channel 52, thereby loosening the closure at the open end of glove 100 to allow removal of the wearer's hand from the glove and subsequent reentry.

Reference is next made to FIG. 6 wherein a sack, generally indicated as 200, constructed in accordance with another embodiment of the invention, is depicted, like elements being identified by like reference numerals.

Sack 200 includes a bag portion 201 with an open end 202. A channel member 51 is attached, such as by sewing or an adhesive near the open end 202 of sack 201. A shockcord 54 is contained within channel 52 in the same way as shown in FIGS. 1-5. The closure mechanism for sack 200 operates in a substantially identical fashion as does the glove closure mechanism. It is noted that, rather than being present at the extreme end of the open end of the sack, the closure mechanism is a short distance from the open end. The closure mechanism can be either at the open end of the sack, glove or other container or a distance from the open end of the container as shown in FIG. 6. The location of the closure mechanism can be changed dependent upon the use of the container and aesthetic considerations.

Reference is next made to FIG. 7 wherein a handbag generally indicated as 300 constructed in accordance with another embodiment of the invention is depicted, like elements having like reference numerals. Handbag 300 includes a sack portion 301 with an open end 302 and a covering flap 303. Covering flap 303 has a strap 304 with a hook or pile connector patch 305 which mates with a pile or hook connector patch 306 on pouch portion 301. A channel member 51 is at the edge of open end 302 of pouch 301 and is formed substantially identically to closure 50 shown in FIGS. 1-5. The only difference is the provision of handle 307 at free ends 54a, 54b of shockcord 54. The closure mechanism for handbag 300 operates in a substantially identical fashion to closure mechanism 50 shown in FIGS. 1-5. The only difference is that the user pulls on handle 307 to close the open end of the pouch. Handle 307 in a preferred embodiment is a leather patch folded over the free ends of shockcord 54 and then stitched in place so that the free ends of shockcord 54 do not pull out of handle 307 and handle 307 has some structural rigidity. Thereafter, strap 304 with mating hook and pile connectors 305, 306 holds flap 303 in place over the closed open end 302 for aesthetic purposes. The closure mechanism is released in the same fashion as in the embodiment described above, i.e., by pulling on handle 59 while holding onto another portion of handbag 300.

Reference is next made to FIG. 8 wherein a jacket generally indicated as 400 constructed in accordance with another embodiment of the invention is depicted, like elements having like reference numerals. Jacket 400 includes a closure mechanism, generally indicated as 450, about the waist of the jacket 400. Closure mechanism 450 is used to tighten the garment about the wearer's waist to improve the insulating characteristics of jacket 400. Closure mechanism 450 includes a channel member 51 with a channel 52 and a shockcord 54. However, only one end of shockcord 54 extends out of channel member 51 where it is finished with a handle portion 407. The other end of shockcord 54, indicated as 402, is fixed in place within channel 52 so that when pressure is applied to the free end of shockcord 54 by pulling on handle portion 407, free end 402 remains fixed in place. Closure mechanism 450 operates in substantially the same fashion as closure mechanism 50 shown in FIGS. 1-5. The closure mechanism arrangement in which two portions of shockcord 54 extend out of channel 52 provides a stronger and more efficient closure mechanism. However, the approach shown in FIG. 8 operates in the same way as is suitable for most applications.

Accordingly, an improved closure mechanism for containers with an open end and tubular portions and in particular gloves and even more particularly ski gloves which allows for one handed, secure closing of the open end and one handed release of the closure mechanism is provided.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A closure mechanism for an open-ended container, comprising:
    channel means coupled at or near the end of the container for forming a channel of an opened length, corresponding to a distance around the open end of the container, having a channel cross-sectional area and terminating with two closely spaced openings having an opening cross-sectional area;
    stretchable cord means, within the channel and extending outward beyond both openings, having an unstretched cross-sectional area and a stretched cross-sectional area, the unstretched cross-sectional area being larger than the stretched cross-sectional area and the opening cross-sectional area;
    whereby pulling on the portion of the stretchable cord means extending out of both openings causes the stretchable cord means to take on the stretched cross-sectional area at least proximate the openings to freely slide in the channel and then releasing the stretchable cord means causes the stretchable cord means to return to the unstretched cross-sectional area proximate the openings, thereby locking the stretchable cord means in the openings and shortening the channel to a closed length less than the open length and securing the open end of the container in a closed position, wherein the channel means is formed of a crushable material means for gathering when the channel is shortened from the open length to the closed length.

2. The closure mechanism of claim 1 wherein the stretchable cord means includes a shockcord having two free ends, the free ends of the shockcord extending beyond both openings.

3. The closure mechanism of claim 2 wherein the free ends are coupled to a handle means for preventing entry of the free end into the channel and for providing a gripping surface.

4. The closure mechanism of claim 1 wherein the channel cross-sectional area is greater than the unstretched cross-sectional area of the stretchable cord means.

5. The closure mechanism of claim 4 wherein the opening cross-sectional area is less than the unstretched cross-sectional area of the stretchable cord means.

6. The closure mechanism of claim 1 wherein the opening cross-sectional area is greater than the stretched cross-sectional area of the stretchable cord means.

7. The closure mechanism of claim 1 wherein the channel means further includes insert means coupled to the channel means within the channel for providing an opening cross-sectional area less than the channel cross-sectional area.

8. The closure mechanism of claim 7 wherein the insert means includes a polyvinylchloride coated cotton material having a non-slip finish.

9. The closure mechanism of claim 7 wherein the insert means is sewn to the channel member proximate both openings.

10. The closure mechanism of claim 1 wherein the stretchable cord means is an elastic shockcord including elastic strips surrounded by a stretchable cover.

11. The closure mechanism of claim 11 wherein the stretchable cover is formed of a woven cotton.

12. The closure mechanism of claim 1 further comprising release means for enabling enlargement of the channel from the closed length to the opened length, coupled to the container proximate the closely spaced openings.

13. The closure mechanism of claim 12 wherein the release means includes a handle member, adapted to be gripped between two fingers, coupled to the container proximate the closely spaced openings.

14. The closure mechanism of claim 12 wherein the release means includes a handle operable with one hand.

15. A closure mechanism for a glove, comprising:
    channel means for forming a channel at or near a hand opening of the glove having an opened length corresponding to an opened distance around the hand opening, the channel having a channel cross-sectional area and terminating with two closely spaced openings having an opening cross-sectional area;
    stretchable cord means, within the channel extending outwardly beyond both openings, having an unstretched cross-sectional area and a stretched cross-sectional area, the unstretched cross-sectional area being larger than the stretched cross-sectional area and the opening cross-sectional area;
    whereby pulling on the portion of the stretchable cord means extending out of both openings causes the stretchable cord means to take on the stretched cross-sectional area proximate at least one opening to freely slide in the channel and then releasing the stretchable cord means causing the stretchable cord means to take on the unstretched cross-sectional area proximate both openings thereby locking the stretchable cord means in the openings and shortening the channel means to a closed distance less than the opened length and securing the open end in a closed position wherein the channel means is formed of a crushable material means for gathering when the channel is shortened from the open length to the closed length.

16. The closure mechanism of claim 15 wherein the stretchable cord means includes a shockcord having two free ends, the free ends of the shockcord extending beyond both openings.

17. The closure mechanism of claim 16 wherein the free ends are coupled to a handle means for preventing entry of the free end into the channel and for providing a gripping surface.

18. The closure mechanism of claim 15 wherein the channel cross-sectional area is greater than the unstretched cross-sectional area of the stretchable cord means.

19. The closure mechanism of claim 18 wherein the opening cross-sectional area is less than the unstretched cross-sectional area of the stretchable cord means.

20. The closure mechanism of claim 15 wherein the opening cross-sectional area is greater than the stretched cross-sectional area of the stretchable cord means.

21. The closure mechanism of claim 15 wherein the channel means further includes insert means coupled to the channel means within the channel for providing an opening cross-sectional area less than the channel cross-sectional area.

22. The closure mechanism of claim 21 wherein the insert means includes a polyvinylchloride coated cotton material having a non-slip finish.

23. The closure mechanism of claim 21 wherein the insert means is sewn to the channel member proximate both openings.

24. The closure mechanism of claim 15 wherein the stretchable cord means is an elastic shockcord including elastic strips surrounded by a stretchable cover.

25. The closure mechanism of claim 24 wherein the stretchable cover is formed of a woven cotton.

26. The closure mechanism of claim 15 further comprising release means for enabling enlargement of the channel from the closed length to the opened length, coupled to the container proximate the closely spaced openings.

27. The closure mechanism of claim 29 wherein the release means includes a handle member adapted to the grip between two gloved fingers, coupled to the container proximate the closely spaced openings.

28. The closure mechanism of 26 wherein the release means includes a handle operable with one hand.

29. A closure mechanism for a tubular member, comprising:
channel means coupled around the tubular member at a closure location for forming a channel of an opened length, corresponding to a distance around the tubular member at the closure location, having a channel cross-sectional area and terminating with two closely spaced openings having an opening cross-sectional area;
stretchable cord means, within the channel and extending outward beyond both openings, having an unstretched cross-sectional area and a stretched cross-sectional area, the unstretched cross-sectional area being larger than the stretched cross-sectional area and the opening cross-sectional area;
whereby pulling on the portion of the stretchable cord means extending out of both openings causes the stretchable cord means to take on the stretched cross-sectional area at least proximate the openings to freely slide in the channel and then releasing the stretchable cord means causes the stretchable cord means to return to the unstretched cross-sectional area proximate the opening, thereby locking the stretchable cord means in the openings and shortening the channel to a closed length less than the open length and securing the tubular member at the closure location in a closed position wherein the channel means is formed of a crushable material means for gathering when the channel is shortened from the open length to the closed length.

30. The closure mechanism of claim 29 further including release means for lengthening the channel from the closed length to the opened length, coupled to the tubular member proximate the two closely spaced openings.

31. The closure mechanism of claim 30 wherein the release means includes a handle adapted to be operated by one hand.

32. A closure mechanism for a tubular member, comprising:
channel means coupled to a tubular member at a closure location, for forming a channel of an opened length, corresponding to a distance around the tubular member at the closure location, having a channel cross-sectional area and terminating with at least one opening having an opening cross-sectional area;
stretchable cord means, within the channel and extending outward beyond the at least one opening, having an unstretched cross-sectional area and a stretched cross-sectional area, the unstretched cross-sectional area being larger than the stretched cross-sectional area and the opening cross-sectional area;
whereby pulling on the portion of the stretchable cord means extending out of the at least one opening causes the stretchable cord means to take on the stretched cross-sectional area at least proximate the at least one opening to freely slide in the channel and then releasing the stretchable cord means causes the stretchable cord means to return to the unstretched cross-sectional area proximate the at least one opening, thereby locking the stretchable cord means in the at least one opening and shortening the channel to a closed length less than the opened length and securing the closure location of the tubular member in a closed position wherein the channel means is formed of a crushable material means for gathering when the channel is shortened from the open length to the closed length.

33. The closure mechanism of claim 32 wherein the stretchable cord means includes two ends, one of the ends being fixed to the channel means within the channel and the other end extending outwardly beyond the opening.

34. The closure mechanism of claim 36 further including release means, for lengthening the channel from the closed length to the opened length, coupled to the tubular member proximate at least one opening.

35. The closure mechanism of claim 34 wherein the release means includes a handle adapted to be operated by one hand.

36. A closure mechanism for an open-ended container, comprising
channel means coupled at or near the end of the container for forming a channel of an opened length, corresponding to distance around the open end of the container, having a channel cross-sectional area and terminating with two closely spaced openings having an opening cross-sectional area;
stretchable cord means, within the channel and extending outward beyond both openings, having an unstretched cross-sectional area and a stretched cross-sectional area, the unstretched cross-sectional area being larger than the stretched cross-sectional area and the opening cross-sectional area; and
release means for enabling enlargement of the channel from the closed length to the opened length, coupled to the container proximate the closely spaced openings;
whereby pulling on the portion of the stretchable cord means extending out of both openings causes the stretchable cord means to take on the stretched cross-sectional area at least proximate the openings to freely slide in the channel and then releasing the stretchable cord means causes the stretchable cord means to return to the unstretched cross-sectional area proximate the openings, thereby locking the stretchable cord means in the openings and shortening the channel to a closed length less than the open length and securing the open end of the container in a closed position.

* * * * *